Patented Jan. 22, 1952

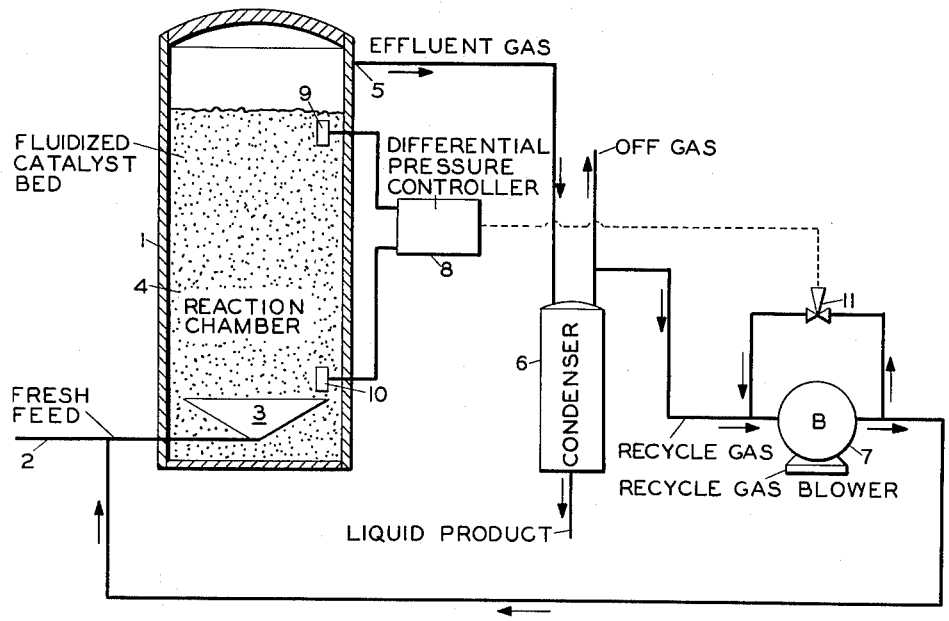

2,583,255

UNITED STATES PATENT OFFICE 2,583,255

CONTROL OF CATALYST CONCENTRATION

Alfred Clark, Bartlesville, Okla., assignor to Phillips Petroleum Company, a corporation of Delaware Application May 24, 1948, Serial No. 28,779

9 Claims. (Cl. 260—449.6)

This invention relates generally to a process for the synthesis and/or conversion of hydrocarbons. In one of its aspects it relates to a method for controlling the catalyst concentration in a hydrocarbon synthesis and/or conversion reaction carried out in the presence of a fluidized catalyst. This invention is especially useful for maintaining a constant fluidized catalyst concentration in a hydrocarbon synthesis reaction zone.

This invention is particularly applicable to the catalytic synthesis of hydrocarbons and/or oxygenated organic compounds from hydrogen and carbon monoxide in which the fluidized bed process is employed, but it will be apparent to one skilled in the art that this invention is also applicable to any process in which solid particles are suspended in an upward flowing gas stream. In a hydrocarbon synthesis, feed gas comprising hydrogen and carbon monoxide is passed into the bottom of an elongated vertical reaction chamber, and it flows upwardly through a mass of finely divided catalytic material maintained at an elevated reaction temperature. The velocity of the influent gas maintains the catalytic material in a fluidized and ebullient condition. The influent gas and the reaction products pass through the reaction chamber in opposition to the gravitational force acting upon the catalyst, and as a result the catalyst assumes a condition of fluidity with the catalyst density greater in the lower portion of the catalyst bed than in the upper portion, the effluent gas being relatively free of catalyst.

In order that the fluidized bed operation can be carried out at maximum efficiency it is essential that conditions hindering high rates of conversion be kept as ineffectual as possible. If the influent gas is not evenly distributed within the reaction chamber, regions of stagnant catalyst and channeling of the gas flowing through the catalyst will result and cause a corresponding decrease in the rate of conversion. Poor gas and catalyst distribution will also cause poor heat distribution with resultant overheating and increased carbonaceous deposits upon the catalyst. These are only a few of the reaction-deterring conditions that must be avoided when using a fluidized catalyst.

An important feature of the fluidized bed operation is the maintenance of a substantially constant catalyst concentration in the reactor, particularly in a hydrocarbon synthesis. The synthesis reaction is highly exothermic and if the catalyst concentration becomes too great the difficulty of maintaining a close temperature control is magnified. Also, if the catalyst concentration becomes too low, the rate of conversion of the influent gas into the desired products is decreased causing a decreased production efficiency.

An object of this invention is to provide a method for controlling the catalyst concentration in a fluidized bed within a reaction chamber and thereby eliminating some of the frequently occurring difficulties described above. An additional object is to control the density of a fluidized hydrocarbon synthesis catalyst in a synthesis reaction zone in the presence of gaseous reactants in order to obtain efficient production of hydrocarbons. A further object of the invention is to provide a means for avoiding undesirable conditions within the reaction chamber by making possible a high degree of contact between the gas and the catalyst while maintaining a high degree of conversion. Additional and further objects of this invention will appear in the description that follows.

I have found that these objects can be achieved in accordance with my invention by utilizing a specific method for controlling the velocity of the influent gas since the catalyst concentration is dependent upon this velocity.

The specific method that I use is predicated upon recycling a portion of the effluent products from the reaction chamber to the reaction zone, and by controlling the rate of recycle I control the velocity of the influent gases to the reaction chamber. Although any method that is used to control the rate of recycle to maintain a constant catalyst concentration is within the scope of my invention, I prefer to effect the control by the use of vertically spaced pressure responsive devices which are connected to a differential pressure controller. This controller maintains a substantially constant pressure differential between the pressures responsive devices. If a change in pressure differential occurs, in accordance with my preferred method of operation, the differential pressure controller will vary the rate of recycle of the effluent products in response to and to compensate for the variations in the pressure differential. Thus, I automatically maintain a substantially constant catalyst concentration in the reaction zone.

The effluent gases from the reaction chamber contain methane, ethane, ethylene, propane, propylene, butane, butylene, higher boiling hydrocarbons, oxygenated products, carbon dioxide and unreacted carbon monoxide and hydrogen. If a portion of this gas is recycled to the reactor with the influent gas it performs the dual function of supplementing the influent gas velocity in maintaining the catalyst in a fluidized condition and of aiding in the removal of the exothermic heat of reaction. Therefore, controlling the rate of effluent gas recycle provides an excellent means for controlling the catalyst density in the reactor, because it is an effective means for controlling the velocity of the influent gas.

Under normal operating conditions variations in the catalyst density will occur. The causes for these variations may be changes in the velocity of the influent gas, changes in the amount of gas contraction in the reactor, changes in the amount of carbon on the catalyst, or other unavoidable factors. The method of my invention compensates for any of these process changes and keeps the catalyst concentration substantially constant.

The recycling of effluent gas is not novel since this procedure has been used previously as a means for controlling the temperature within a reaction zone. The catalyst concentration within a reaction zone has also been controlled by utilizing the pressure differential between the top and the bottom of the reactor, but as a means of control the methods for controlling catalyst concentration depended upon either varying the rate of the products and catalyst leaving the reactor which in turn controlled the pressure within the reactor or varying the rate of recycle of partially spent catalyst. While such methods may be applicable to cracking processes, they are not as effective in a synthesis reaction because of the great volume reduction in the direction of flow under which circumstances the problem of maintaining fluidization of the catalyst is greatly accentuated.

The process of my invention when used in a hydrocarbon synthesis reaction can be carried out at recycle gas to fresh gas volume ratios varying between 1:1 and 8:1. Various catalysts may be utilized, but for the synthesis reaction an excellent catalyst is powdered metallic iron screened to 65 to 100 mesh size. It may be prepared by precipitation or by fusion of iron oxide followed by reduction with hydrogen, and various promoters such as alkali or alumina may be added. The minimum velocity of the influent gas required to maintain the catalyst bed in a state of fluidity using a metallic iron catalyst of 65 to 100 mesh size is approximately 0.6 feet per second. Velocity increases result in decreases in catalytic concentration, and at velocities greater than about 5.5 feet per second the catalyst is carried out of the reactor with the effluent gas. The most preferable composition of the feed gas is two mols of hydrogen to one mol of carbon monoxide, but molar ratios of hydrogen to carbon monoxide of from 1:1 to 3:1, preferably 1.8:1 to 2.2:1, may be used. The reaction temperature may vary from 500–750° F. and the reaction may be carried out at pressures varying from 50 to 500 pounds per square inch. The space velocities employed may be from 500 to 5000 volumes of fresh gas per volume of catalyst per hour, but the above are merely preferable conditions. It is obvious that my invention may be practiced while using conditions outside the ranges specified above.

The accompanying drawing is a diagrammatic drawing showing the preferred method of operation of my invention, but it will be obvious to one skilled in the art that numerous variations, rearrangements of apparatus, and additional apparatus such as cyclone separators, etc., could be used without going beyond the scope of my invention. The influent gas containing hydrogen and carbon monoxide in the desired molar ratio is fed into reactor 1 through inlet 2 and a conical distributor 3. The reaction takes place in the "fluidized" catalytic bed 4, and the effluent gas, containing hydrocarbons of varying molecular weight, oxygenated derivatives thereof, carbon dioxide, and unreacted carbon monoxide and hydrogen, leaves the reactor at outlet 5 and passes into condenser 6 where the effluent products that contain at least four carbon atoms per molecule are condensed and separated as liquid product. The remaining gaseous products are available for recycling to reactor 1. If only a portion of the gaseous products is required for recycling, the unrequired portion is bled from the system through the line marked "off gas." The gas that is required for recycling is forced by recycle gas blower 7 through the recycle gas line back to inlet line 2 where it is mixed with the fresh feed. The volume and rate of gas that is recycled by blower 7 is controlled by control valve 11 whose operation is controlled by differential pressure controller 8 which is provided with the necessary electrical, mechanical or pneumatic equipment for controlling the operation of valve 11 by means of the connecting dotted line on the drawing. Differential pressure controller 8 is connected to two pressure responsive devices, preferably diaphragms, 9 and 10. It is known that a fluidized bed of catalyst has physical properties similar to those of a liquid and that a fluidized catalyst exerts a hydrostatic pressure. Thus, a hydrostatic pressure is exerted upon diaphragms 9 and 10, and by placing 9 and 10 on vertically spaced horizontal planes within the reaction zone a pressure differential will be conveyed to controller 8 which is provided with means for measuring the pressure differential. Controller 8 is adjusted to maintain a constant pressure differential between 9 and 10. If a variation occurs, controller 8 activates valve 11 which adjusts the volume and rate of the recycle gas, and the constant pressure differential is restored. As a consequence of the maintenance of the constant pressure differential in this manner, the catalyst concentration is also maintained substantially constant.

In the drawing I have shown valve 11 as being in a line or conduit through which a portion of the recycle gas passes after it leaves blower 7 and this line returns the gas to the recycle gas line at a point prior to the entrance of the recycle gas into blower 7. By varying the volume of recycle gas passing through valve 11 as controlled by differential pressure controller 8, it is obvious that the volume and rate of the recycle gas entering fresh feed line 2 will be varied. This is my preferred method of operation, but any method that varies the recycle gas volume and rate in accordance with controller 8 is within the scope of my invention. For example, it is within the scope of my invention that differential pressure controller 8 may be connected directly by suitable means to recycle blower 7. Valve 11 and the line in which it is placed would then be unnecessary, and controller 8 would regulate the volume and rate of the gas being recycled by regulation of the speed of blower 7. Other variations of my invention will be apparent to those skilled in the art.

In the drawing I have shown pressure responsive devices 9 and 10 as positioned at about the upper and lower extremities of the fluidized catalyst bed. These positions are not critical, but I prefer to operate in the manner shown. Pressure responsive devices 9 and 10 may be placed at any position within the fluidized catalyst bed, but there must be a vertical separation between 9 and 10 in order that a differential pressure can be measured and controlled by controller 8. Also the actual differential pressure between 9 and 10 is not critical for my invention, and its value will depend upon the synthesis system being used, the catalyst concentration, the vertical distance between devices 9 and 10 and other variable factors.

The foregoing description is merely one specific embodiment of my invention, but, since the process and equipment may be varied, the invention should not be confined to this specific method of operation. Also, this invention is not only applicable to hydrocarbon synthesis processes but it is also adaptable to other processes employing a "fluidized bed" of powdered solids.

I claim:

1. In a process for the synthesis of hydrocarbons and oxygenated organic compounds wherein a finely divided catalyst is suspended in a reaction zone in a stream of upward flowing synthesis gas comprising hydrogen and carbon monoxide in the molal ratio of from 1:1 to 3:1, the improved method of controlling the density of said catalyst in said reaction zone under substantially constant pressure which comprises recycling to said reaction zone with the influent gas at least a portion of the effluent gas leaving said reaction zone, and maintaining a pressure differential substantially constant between two vertically separated points in said reaction zone by varying the rate of recycle of said portion of effluent gas in response to and to compensate for variations in said pressure differential whereby the density of the suspended catalyst is maintained substantially constant and whereby the pressure within the reaction zone is maintained substantially constant.

2. In a process for the synthesis of hydrocarbons and oxygenated organic compounds wherein a finely divided catalyst is suspended in a reaction zone in a stream of upward flowing synthesis gas comprising hydrogen and carbon monoxide in the molal ratio of from 1.8:1 to 2.2:1, the improved method of controlling the concentration of said catalyst in said reaction zone which comprises separating from the effluent products from said reaction zone products containing at least four carbon atoms per molecule, recycling to said reaction zone with the influent gas at least a portion of the effluent products containing less than four carbon atoms per molecule, maintaining the pressure differential between the top and bottom of said reaction zone substantially constant by varying the rate of recycle of said portion of effluent gas containing less than four carbon atoms per molecule in response to and to compensate for variations in pressure differential whereby the density of the suspended catalyst is maintained substantially constant and whereby the pressure within the reaction zone is maintained substantially constant.

3. A method according to claim 2 wherein the volume ratio of recycled effluent gas to fresh synthesis gas varies between 1:1 and 8:1.

4. A method according to claim 2 wherein the catalyst is a reduced iron oxide catalyst.

5. A method according to claim 2 wherein the catalyst is a reduced iron oxide catalyst promoted with at least one metallic oxide promoter.

6. Apparatus for contacting gases and finely divided catalysts suspended in said gases which comprises an elongated vertical reaction chamber, means for introducing finely divided catalyst into the lower portion of said chamber, means for introducing said gases into the lower portion of said chamber at a point such that said gases pass upwardly through said catalyst, means for withdrawing effluent gases from the upper portion of said reaction chamber, means for recycling at least a portion of said withdrawn effluent gases to the lower portion of said chamber, means for measuring the pressure differential between two vertically separated points in said reaction chamber, and means for automatically varying the rate of recycle of said portion of effluent gas operatively connected to said means for measuring pressure differential between the two said vertically separated points in said reaction chamber.

7. An apparatus according to claim 6 wherein said means for recycling effluent gases extends to said means for introducing said gas into said chamber.

8. In a process for the synthesis of hydrocarbons and oxygenated organic compounds wherein a finely divided catalyst is suspended in a reaction zone in a stream of upward flowing synthesis gas comprising hydrogen and carbon monoxide in the molal ratio of from 1.8:1 to 2.2:1, the improved method of controlling the concentration of said catalyst in said reaction zone which comprises separating from the effluent products from said reaction zone products containing at least 4 carbon atoms per molecule, passing a portion of the effluent products containing less than 4 carbon atoms per molecule to a gas velocity accelerating means, passing said portion of effluent products from said accelerating means to said reaction zone, measuring the pressure differential between two vertically separated points in said reaction zone, and varying the velocity at which said portion of effluent products passes from said gas velocity accelerating means to said reaction zone in response to and to compensate for variations in pressure differential so measured whereby the density of suspended catalyst in said reaction zone is maintained substantially constant and whereby the pressure within the reaction zone is maintained substantially constant.

9. In a process for the synthesis of hydrocarbons and oxygenated organic compounds wherein a finely divided catalyst is suspended in a reaction zone in a stream of upward flowing synthesis gas comprising hydrogen and carbon monoxide in the molal ratio of from 1.8:1 to 2.2:1, the improved method of controlling the concentration of said catalyst in said reaction zone which comprises separating from the effluent products from said reaction zone products containing at least 4 carbon atoms per molecule, passing a portion of the effluent products containing less than 4 carbon atoms per molecule to a gas blower, passing said portion of effluent products from said gas blower to said reaction zone, measuring the pressure differential between the top and bottom of said reaction zone, and varying the velocity at which said portion of effluent products passes from said gas blower to said reaction zone by varying the operation of said gas blower in response to and to compensate for variations in pressure differential so measured whereby the density of suspended catalyst in said reaction zone is maintained substantially constant and whereby the pressure within the reaction zone is maintained substantially constant.

ALFRED CLARK.

REFERENCES CITED

The following references are of record in the file of this patent:

UNITED STATES PATENTS

| Number | Name | Date |
|---|---|---|
| 2,271,148 | Becker et al. | Jan. 27, 1942 |
| 2,360,787 | Murphree et al. | Oct. 17, 1944 |
| 2,417,164 | Huber, Jr. | Mar. 11, 1947 |